US010941686B2

(12) United States Patent
Crawford et al.

(10) Patent No.: US 10,941,686 B2
(45) Date of Patent: *Mar. 9, 2021

(54) GASEOUS EMISSIONS TREATMENT STRUCTURE AND METHOD FOR INDUCTION HEATING

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 23 days.

This patent is subject to a terminal disclaimer.

(21) Appl. No.: 16/256,654

(22) Filed: Jan. 24, 2019

(65) Prior Publication Data
US 2019/0160429 A1 May 30, 2019

Related U.S. Application Data

(63) Continuation-in-part of application No. 15/279,423, filed on Sep. 28, 2016, now Pat. No. 10,226,738.
(Continued)

(51) Int. Cl.
*F01N 3/027* (2006.01)
*F01N 3/20* (2006.01)
(Continued)

(52) U.S. Cl.
CPC ........... *F01N 3/027* (2013.01); *F01N 3/2013* (2013.01); *B01D 53/9418* (2013.01);
(Continued)

(58) Field of Classification Search
CPC .... F01N 3/027; F01N 3/2013; F01N 2240/16; F01N 2330/30; F01N 2550/22; B01D 2259/80; B01D 2259/814
See application file for complete search history.

(56) References Cited

U.S. PATENT DOCUMENTS 4,276,066 A * 6/1981 Bly ...................... F01N 3/0214
55/287
10,132,221 B2 * 11/2018 Crawford .............. F01N 3/2828
(Continued)

FOREIGN PATENT DOCUMENTS

DE 10345925 A1 * 5/2005 ........... B01D 46/521

OTHER PUBLICATIONS

Machine translation of DE-10345925-A1, accessed Jul. 23, 2020. (Year: 2020).*

*Primary Examiner* — Jonathan R Matthias
(74) *Attorney, Agent, or Firm* — Stuart L. Wilkinson (57) ABSTRACT

An assembly for treating gaseous emissions has a substrate along which extend cells for the passage of emissions gas. Lengths of conducting wire are located in a set of the cells and an induction heating coil is used to generate a varying electromagnetic field, so as to inductively heat the lengths of conducting wire. The substrate body has a front for entry of flowing emissions gas to be treated into the substrate body and a back for exit of treated gaseous emissions gas. The lengths of conducting wire have projections extending from the front and/or back of the substrate body so that when inductively heated, the wire parts in the substrate body heat the surrounding substrate and the wire projections heat the flowing emissions gas directly.

17 Claims, 6 Drawing Sheets

Related U.S. Application Data which is a continuation-in-part of application No. 14/452,800, filed on Aug. 6, 2014, now Pat. No. 9,488,085.

(60) Provisional application No. 62/234,166, filed on Sep. 29, 2015, provisional application No. 62/258,071, filed on Nov. 20, 2015, provisional application No. 62/306,885, filed on Mar. 11, 2016, provisional application No. 62/322,719, filed on Apr. 14, 2016, provisional application No. 61/879,211, filed on Sep. 18, 2013, provisional application No. 61/910,067, filed on Nov. 28, 2013.

(51) Int. Cl.
*B01D 53/94* (2006.01)
*F01N 3/022* (2006.01)

(52) U.S. Cl.
CPC .................. *B01D 53/9431* (2013.01); *B01D 2255/20723* (2013.01); *B01D 2255/20769* (2013.01); *B01D 2255/20776* (2013.01); *B01D 2255/50* (2013.01); *B01D 2258/012* (2013.01); *B01D 2259/80* (2013.01); *F01N 3/0222* (2013.01); *F01N 3/2026* (2013.01); *F01N 3/2066* (2013.01); *F01N 2240/16* (2013.01); *F01N 2330/00* (2013.01); *F01N 2330/02* (2013.01); *F01N 2330/30* (2013.01); *F01N 2370/04* (2013.01); *F01N 2370/24* (2013.01)

(56) References Cited

U.S. PATENT DOCUMENTS

| | | | |
|---|---|---|---|
| 10,143,967 B2 * | 12/2018 | Crawford | F01N 3/2828 |
| 10,207,222 B2 * | 2/2019 | Crawford | B01D 46/2418 |
| 10,226,738 B2 * | 3/2019 | Crawford | H05B 6/108 |

* cited by examiner

FIG. 15

GASEOUS EMISSIONS TREATMENT STRUCTURE AND METHOD FOR INDUCTION HEATING

CROSS REFERENCE TO RELATED PATENTS

The present U.S. Patent Application is a continuation-in-part application of pending U.S. patent application Ser. No. 15/279,423 filed Sep. 28, 2016, entitled "Apparatus and method for gaseous emissions treatment using front end induction heating", which claims priority pursuant to 35 U.S.C. 119(e) from:
- U.S. Provisional Application Ser. No. 62/234,166 filed Sep. 29, 2015 entitled "Catalytic converter structures with directed induction heating";
- U.S. Provisional Application Ser. No. 62/258,071 filed Nov. 20, 2015 entitled "Catalytic converter system with controlled induction heating and methods for use";
- U.S. Provisional Application Ser. No. 62/306,885 filed Mar. 11, 2016 entitled "Structures for inductive heating";
- U.S. Provisional Application Ser. No. 62/322,719 filed Apr. 14, 2016 entitled "Induction heating structures".

U.S. patent application Ser. No. 15/279,423 is a continuation in part of U.S. patent application Ser. No. 14/452,800 entitled "Catalytic converter structures with induction heating" issued Nov. 8, 2016 which claims priority pursuant to 35 U.S.C. 119(e) from
- U.S. Provisional Application Ser. No. 61/879,211 entitled "Catalytic converter employing electrohydrodynamic technology" filed Sep. 18, 2013, and
- U.S. Provisional Application Ser. No. 61/910,067 entitled "Catalytic converter employing electrohydrodynamic technology" filed Nov. 28, 2013.

All of the above-mentioned applications and patents are hereby incorporated herein by reference in their entirety and made part of the present U.S. Patent Application for all purposes.

FIELD OF THE INVENTION

This invention relates to gaseous emissions treatment structures and methods for use thereof, such structures having particular but not exclusive application to catalytic converters, particulate filters (PFs) and like structures for treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order typically of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Co-pending U.S. patent application Ser. No. 14/452,800 (Catalytic converter structures with induction heating) shows a catalytic converter assembly having a substrate body with a plurality of cells for passage therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

According to an aspect of the invention, there is provided an assembly for treating gaseous emissions comprising a substrate body having a plurality of cells for the passage of emissions gas, respective lengths of conducting wire located in each of a first set of the plurality of cells, and an induction heating coil for generating a varying electromagnetic field, thereby to inductively heat the lengths of conducting wire, the substrate body having a front for entry of flowing gaseous emissions and a back for exit of treated gaseous emissions, at least some of the lengths of conducting wire having a part projecting from at least one of the front and back of the substrate body.

According to another aspect of the invention, there is provided a method for treating emissions gas using a substrate body having a plurality of cells for the passage of the emissions gas, respective lengths of conducting wire located in each of a first set of the plurality of cells, the substrate body having a front for entry of the emissions gas into cells of a second set of the plurality of cells and a back for exit of treated emissions gas, at least some of the lengths of conducting wire having a respective part projecting from at least one of the front and back of the substrate body, the method comprising generating a varying electromagnetic field thereby to inductively heat the lengths of conducting wire, the heated conducting wire within the cells of the first set operating to heat the substrate body and thereby heat the emissions gas passing through cells of the second set, the heated projecting parts operating to directly heat adjacent emissions gas at at least one of upstream of the substrate body and downstream of the substrate body.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
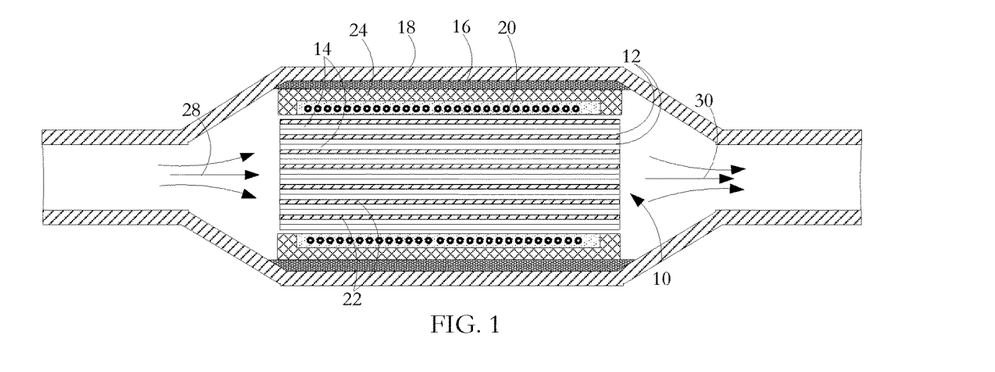
FIG. 1 is a longitudinal sectional view of a gaseous emissions treatment unit configured for induction heating.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material—containing clay or a mix of clay and particulate ceramic—is extruded through an appropriately shaped die and units are cut successively from the extrusion. The units are fired to convert the clay component to ceramic and are then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be a catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_X$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A sheet metal casing or can 18 transitions between the parts of an exhaust pipe (not shown) fore and aft of the gaseous emissions treatment component so as to encompass the blanket-wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick over a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. Exhaust gases 28 to be treated enter the front 36 of the gaseous emissions treatment component 10 and treated exhaust gases 30 exit from its rear 40. In the course of passing along the cells 14, the exhaust gases, the ceramic brick 10 and the catalyst coating on the cell walls is heated to promote treatment processes where the flowing gases contact the catalyst layer. Especially when the vehicle engine is being run at optimal operating temperature and when there is substantial through-put of exhaust gases, such treatment components operate substantially to reduce the presence of noxious gaseous emissions entering the atmosphere. Such components have shortcomings however at start-up when the interior of the brick is at low temperature, during idling periods in city driving or when waiting for a coffee at a Tim Hortons drive-through, and between electric driving periods for hybrid vehicles.

Brick shape, profile and cell densities vary among different manufacturers. For example, while most bricks are round, some are oval, square or irregular in cross-sectional shape. Some assemblies have single stage bricks that are generally heavily wash-coated with the catalyst metals, while others may have two or three bricks with different wash-coatings in each brick. Some exhausts have 400, 600 and 900 (or higher) cpsi cell densities used in the full exhaust assembly, while others use only 400 cpsi bricks throughout. A close-coupled converter may be mounted up close to the exhaust manifold with a view to reducing the period between start-up and light-off temperature. An under-floor converter can be located further from the engine where it will take relatively longer to heat up but be relatively larger and used to treat the majority of gases once the exhaust assembly is up to temperature. In another configuration, a component for reducing the period to light-off temperature and a component to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

As disclosed in U.S. Pat. No. 9,488,085, the gaseous emissions treatment assembly of FIG. 1 is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferromagnetic metal body. Magnetic domain polarity is not easily reversed and the resistance to reversal causes further heat generation in the metal.

Figure 2:
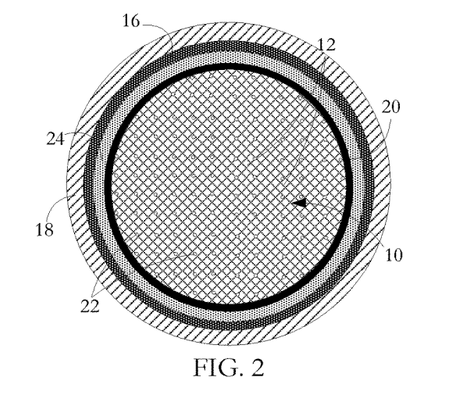
FIG. 2 is a cross-sectional view of the unit of FIG. 1.

As illustrated in FIGS. 1 and 2, surrounding the ceramic substrate body 10 is a metal coil 20 and, although not visible in FIG. 2, located within selected ones of the cells 12 are conducting elements 22 (FIG. 3) such as metal wires/pins. By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control component; and the heated exhaust gas causes exothermic catalytic reactions to be initiated more quickly at the walls 14 compared to the period to initiation by exhaust gas having only heating from operation of the vehicle engine. Conduction from the heated metal elements 22 is the primary source of heat transfer to the ceramic substrate 10 and therefore to the exhaust gases when the emissions component is in operation. There is also a small amount of convective and radiated heat transfer at any small air gaps between metal elements such as wires and the interior surface of the cells within which they are contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance heating elements 22 prevents significant heat transfer from the elements 22 to the coil 10 which would otherwise increase the coil resistivity and so lower its efficiency.

A layer 24 of electromagnetic field shielding/concentrating material is located immediately outside the coil 20 to provide induction shielding and to reduce induction loss to the metal converter housing. The layer 24 also acts to increase inductive coupling to the metal in the substrate body 10 to focus heating. The shield/concentrator 24 can be made from a ferrite or other high-permeability, low-power-loss materials such as Giron, MagnetShield, Papershield, Finemet, CobalTex, or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield/concentrator 24, magnetic flux produced by the coil 20 could spread around the coil 20 and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the layer 24 operates to direct or concentrate the magnetic field to the substrate body 10 providing selective or enhanced heating of a desired region of the substrate body 10, for example, by redirecting magnetic flux that would otherwise travel away from that desired region. In particular, the layer 24 operates to concentrate the magnetic flux produced by the coil 20 towards the heating elements 22 in the substrate body 10 for more efficient heating. As an additional benefit, the magnetic shield can improve the electrical efficiency of the induction coil 20 by increasing power transfer.

The coil is contained in a fiber insulation sheath 26 with the sheathed coil being encased in a in cast, cured insulation. The sheath functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitably alumino-silicate mastic. Alternatively, the substrate body can be wrapped in an alumino-silicate fiber paper. In one manufacturing method, the copper coil 20 is wrapped around the substrate body and then placed in the casing or can 18. In an alternative manufacturing method, the coil 20 is placed in the can or casing 18 and the substrate body 10 is inserted into the coil/can assembly.

A varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw, although more than 10 kW is possible.

Field produced by the electromagnetic induction coil can be tuned to the metal load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and for hybrids, intermittent change over from internal combustion to electric drive. In an alternative configuration, more than one coil can be used to obtain desired induction effects.

The heating pattern can be determined by appropriate location and configuration of the metal elements 22. A suitable metal for the metal elements is a ferromagnetic metal such as stainless steel grade 430 which has high magnetic permeability and corrosion resistance. Lower permeability alloys such as 300 or 400 series stainless steels may also be used. Alternative metals and non-metals such as graphite can be used depending on particular properties required. For shaping the direction and strength of magnetic flux in the substrate, lower magnetic permeability metals or alloys may be used for the metal elements in the outer cells with relatively higher magnetic permeability metals being used for metal inserts in the inner cells. Metals having very high magnetic permeability may also be used. For example, Kanthal iron-chrome-aluminum alloy stock manufactured by Sandvik has a relative permeability of 9000 and greater. High relative permeability can be achieved using stock made of other alloys including nickel-iron and iron-cobalt alloys.

Figure 3:
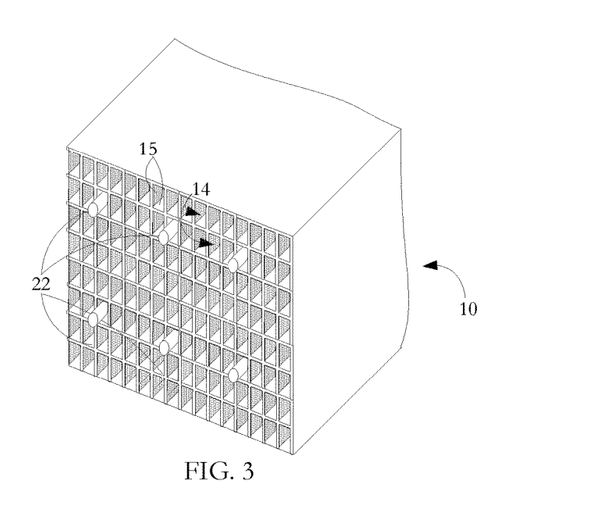
FIG. 3 is a perspective sectional view of a part of a gaseous emissions treatment unit according to an embodiment of the invention showing metal inserts located in cells of a substrate body.

As previously described, in one embodiment, the conducting elements 22 as shown in the detail view of FIG. 3 are wires or pins located in selected ones of the cells 12.

Figure 4:
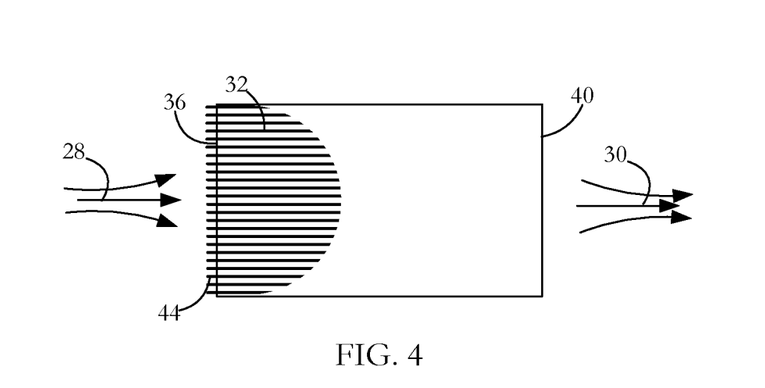
FIG. 4 is a longitudinal sectional representation of a gaseous emissions treatment unit according to an embodiment of the invention having wire segments in cells of a substrate body, the segments having parts projecting from a face of the substrate.

In the embodiment of FIG. 4, a symmetric D-form array of conducting wire segments 32 has wire portions 44 protruding from the front 36 of the substrate body. In operation, the heated protruding wire ends 44 heat exhaust gas 28 directly as it flows into the respective cells. Because there is no part of the substrate body 10 surrounding the wire protrusions 44, the heat goes straight to the exhaust gas 28 and not indirectly via the substrate body 10. This slightly improves the efficiency and time to light-off. The protrusion length is limited to that required in order for the wire to be stable and not easily deform under heat and vibration. The fronts of the coil 20 and the magnetic flux shield/concentrator 24 (not shown in FIG. 4) are located at positions generally matching the positions of the leading tips 42 of the protrusions 44.

Figure 5:
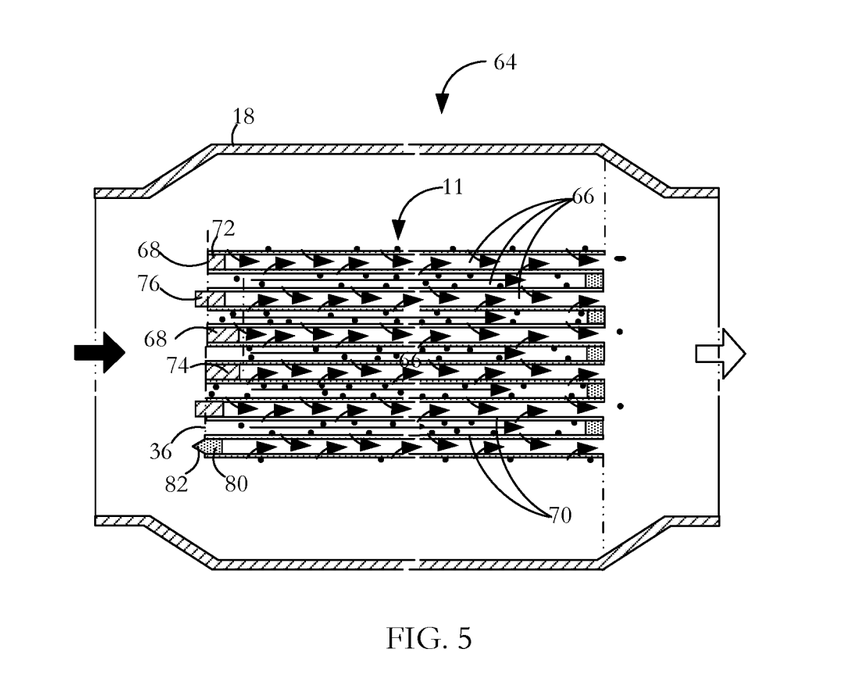
FIG. 5 is a longitudinal sectional representation showing a particulate filter gaseous emissions treatment unit according to an embodiment of the invention.

Referring to FIG. 5, in another embodiment of the invention, an exemplary induction heated particulate filter (PF) 64 is shown, the figure showing solely a part of the substrate body 11 and the outer casing 18. In comparison with a standard PF, some or all of cells 66 that are blocked at the input end of the substrate body 11 are blocked with metal wire segments 68 instead of the conventional ceramic plug. The metal wire segments 68 act to block the particular cells 66 so that a desired flow of exhaust gas through the porous walls 70 of the substrate body 11 is achieved. In addition, the metal wire segments 68, when subject to a varying electromagnetic field, also function as local heaters. As shown in FIG. 5, metal wire plugs 68 in certain cells 66 have lengths different from metal wire plugs in other cells. In one embodiment, metal wire plugs 72 near the outer part of the substrate body 11 are shorter than metal wire plugs 74 near the center of the unit to guide magnetic flux towards the core of the substrate body 11. Induction heating of the metal wire plugs 68 can be actuated during a fuel burn as a contributory part of heating during a regeneration cycle or can be used to preheat the PF so that, in both cases, less fuel need be injected during the fuel regeneration burn itself. If sufficient heat is generated by the induction heating, the use of extra fuel for the regeneration heating cycle may be obviated altogether.

Selection of the length of protrusion from a ceramic substrate front face 70, whether for a catalytic converter or a particulate filter, depends on several factors including cell density (cpsi) of the substrate body, wire array pattern, exhaust gas velocity and the wire diameter/cross-sectional area. In one embodiment of the invention the protrusion length is from one wire diameter upwards with a longer protrusion length corresponding to faster exhaust gas velocities. However, the protrusion length is not made so long that the broken up wave front will re-establish before the pressure wave impinges on the front face of the ceramic substrate for normally experienced exhaust flow rates of up to about 0.55 m$^3$/sec.

Furthermore, the protrusion length is not made so long that there is a risk of the unsupported wire end bending at high temperature such as that experienced, for example, during a regeneration burn. Although illustrated for a PF in FIG. 5, metal segments for catalytic converters can also be configured to protrude from the ceramic brick front surface for the same wave front breaking purpose. In addition, as further illustrated in the FIG. 5, supplementing the effect of the protruding metal plugs, some or all of any ceramic plugs 88 at the leading end 36 of the unit can also be formed to have a wave front-breaking shape. The metal wire for a catalytic converter or metal wire or ceramic plugs for a PF can have protruding parts 76 with a curved or pointed profile as shown at 82 so as to further reduce back pressure.

In this specification, the terms "cell" and "passage" are used interchangeably in relation to the described and claimed manufacturing processes although generally passages characterize catalytic converters and cells characterize particulate filters (PFs). In most catalytic converters, passages are through channels allowing for generally unimpeded flow of emissions gas past hot catalyst coating the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset. However some PFs also have catalyst coating the passage walls. In this specification also, the terms "wire" and "pin" are used interchangeably.

Figure 7:
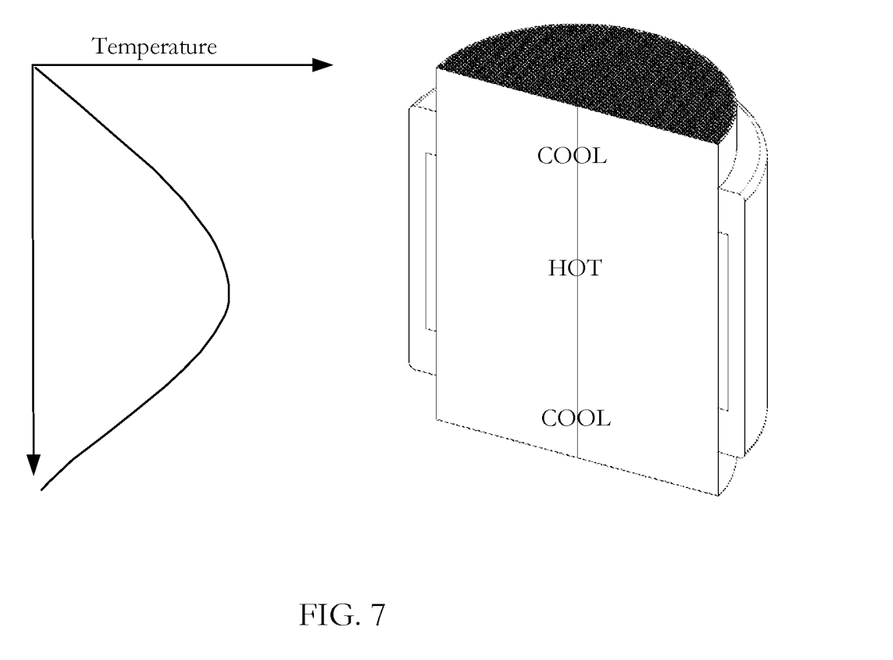
FIG. 7 is a graphical representation showing heating profile along a gaseous emissions treatment unit having heating elements and substrate body that are coextensive.

A heating unit such as that shown in FIG. 7 in which the wire or pin heating elements 22 lie fully within the ceramic substrate 10 and are of the same length or shorter than the length of the substrate delivers moderate heating rates for substrates of the order of 4 to 5 inches in diameter and 5 to 6 inches in length. In these substrates, the length (L) to diameter (D) ratio, L:D>0.75:1. Heating is fairly rapid and moderately intense for such units. Generally, a ceramic substrate 10 with fully contained induction heating elements 22 is made longer than the magnetic flux concentrator 24, and the concentrator, in turn, is made longer than the coil 20. One reason for such a configuration is so that the high-temperature-capable ceramic protects to some extent the lower-temperature-capable coil 20 and magnetic flux concentrator 24 from the flowing exhaust gases which are both hot and corrosive. Another reason is that such an induction heated catalyst assembly produces relatively high efficiency in terms of the conversion of applied power to heat.

However, in some applications, high intensity heating is desirable. Compacting a design below L:D=0.75:1 should, in theory, intensify heating as there is the same amount of power/heat available but applied over a reduced volume, thus leading to more rapid heating or higher temperatures for the same heating time interval. For example, for a given power level, inductively heating with a L:D ratio of 0.38:1 should result in roughly 3× the heating intensity than a L:D ratio of 1.15:1. This should mean approximately ⅓ of the time to achieve a specific temperature or achieving roughly 3× the temperature for a given heating duration.

Figure 6:
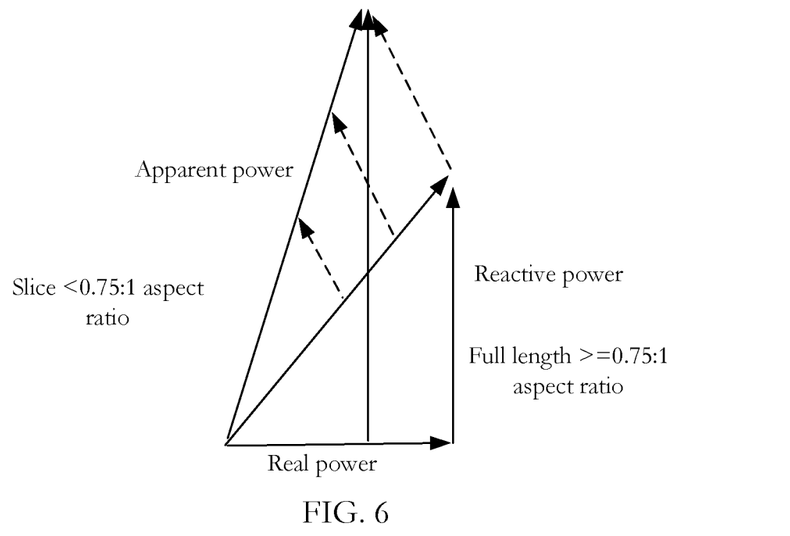
FIG. 6 is an explanatory diagram showing the relationship between real power, apparent power and reactive power for gaseous emissions treatment units embodying the invention.

In fact, at a certain L:D ratio, the electromagnetic efficiency drops at a rate greater than the reduction in heating volume. Thus, there is slower heating to a specific temperature or a lower temperature for a given heating duration. As indicated, the efficiency falls off at ratios of L:D<0.75:1 where the length of the ceramic substrate is less than that of the diameter of the substrate. Exemplary substrates of 2.75 inches and 2.4 inches in length and 4 inches in diameter had L:Ds respectively of 0.68:1 and 0.59:1. While such configurations can be heated, heating is not as efficient or as intense (ramp rate and peak temperature) as for a L:D=1.15:1 configuration. Low L:D ratios also pose a challenge for the induction heated catalyst packaging because the coil, the magnetic flux concentrator, and the heating element geometry can only be compacted so much before other electrical challenges arise. These challenges include a drop in electromagnetic efficiency, where high leakage inductance leads to significant losses to the system outside the heating elements. Such compacted structures experience a drop in the real power and an increase in both the apparent and reactive power (FIG. 6). For inductive heating systems, a power factor of 0.1 or greater is desired. Structures with L:D>=0.75:1 generally achieve this power factor level. Structures with an L:D<0.75:1 see a rapid drop in the power factor. In one example, a 0.38:1 design had a power factor of only 0.03 while a 1.15:1 design had a power factor of 0.12.

The above discussion of substrate length (L) versus diameter (D) is presented in the context of a cylindrical unit. However, it will be appreciated that alternative non-cylindrical configurations are possible. Depending on the cross-sectional shape and size, the point at which the electromagnetic efficiency drops at a rate greater than the reduction in heating volume can be determined by computation or testing in order to determine a suitable length for implementing a high intensity heating 'slice' substrate.

FIG. 6 shows the relationship between real, reactive and apparent powers for an induction heated catalyst unit. As shown in the figure:

the real power is:
  (integral over a period of one cycle of (instantaneous voltage measurement) (instantaneous current measurement))/period of one cycle;
the apparent power is:
  (RMS voltage)*(RMS current);
the reactive power is:
  square root ((apparent power squared)−(real power squared)) the power factor (real power)/(apparent power), is the ratio of the real power absorbed by the load to the apparent power flowing in the circuit, and is a dimensionless number in the closed interval −1 to 1.

Figure 8:
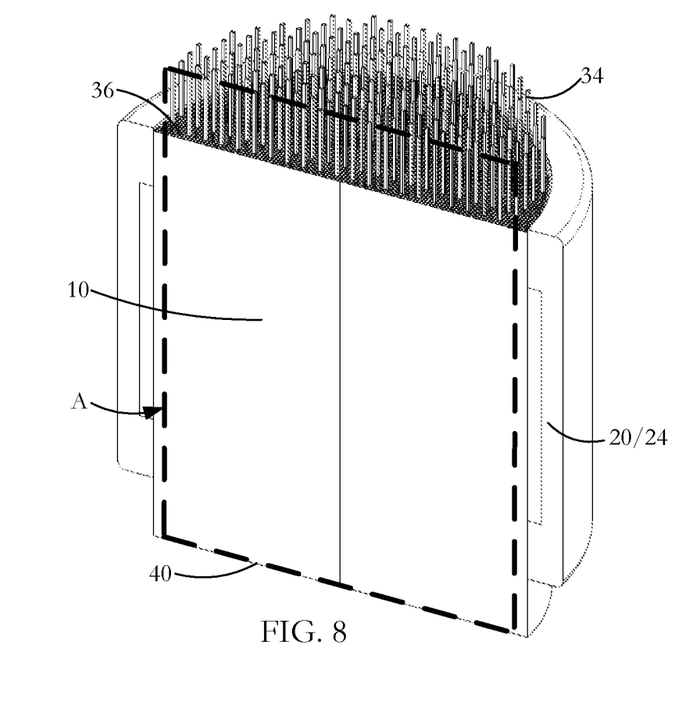
FIG. 8 is a perspective sectional view showing a gaseous emissions treatment unit according to an embodiment of the invention having heating elements projecting from an end face of a substrate body.
Figure 9:
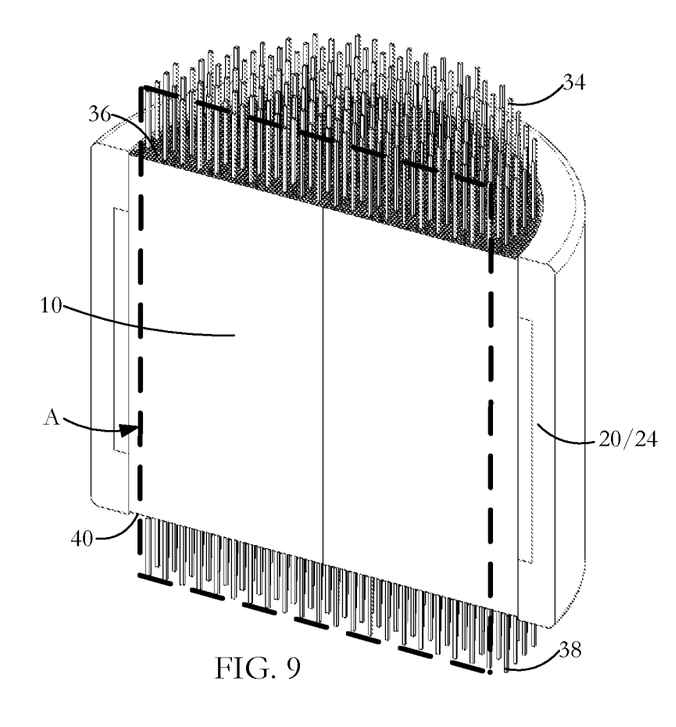
FIG. 9 is a perspective sectional view showing a gaseous emissions treatment unit according to an embodiment of the invention having heating elements projecting from both end faces of a substrate body.

To counteract the drop in electromagnetic efficiency that characterizes short ceramic substrate lengths, in one aspect of the invention as illustrated in FIGS. 8 and 9, there are provided induction heated units in which the heating element profile A is not bound by the envelope of the ceramic substrate 10. As shown in FIG. 8, the unit has heating element projections 34 extending from the front face 36 of the substrate, while in FIG. 9 heating elements 34, 38 protrude respectively from the front face 36 and rear face 40 of the substrate 10. In these structure, a more efficient inductive heating element profile having L:D>=0.75:1 coexists with a reduced ceramic size having L:D<0.75:1.

Figure 10:
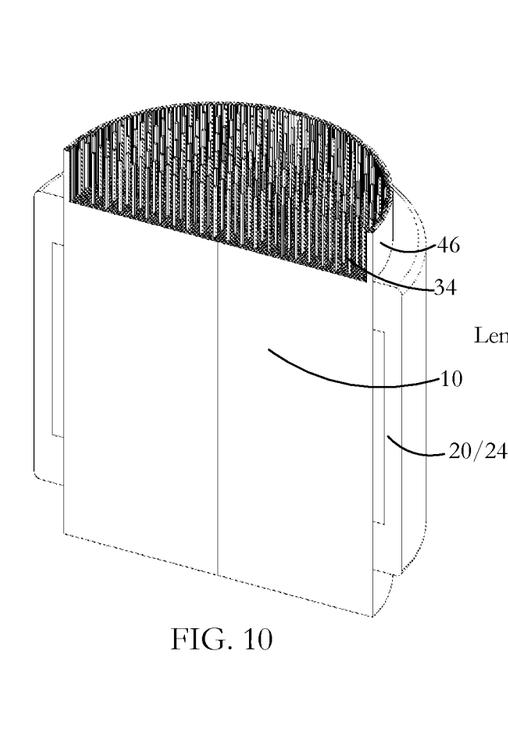
FIG. 10 is a perspective sectional view showing a gaseous emissions treatment unit according to an embodiment of the invention having heating elements projecting from one end face of a substrate body having a stepped configuration.
Figure 11:
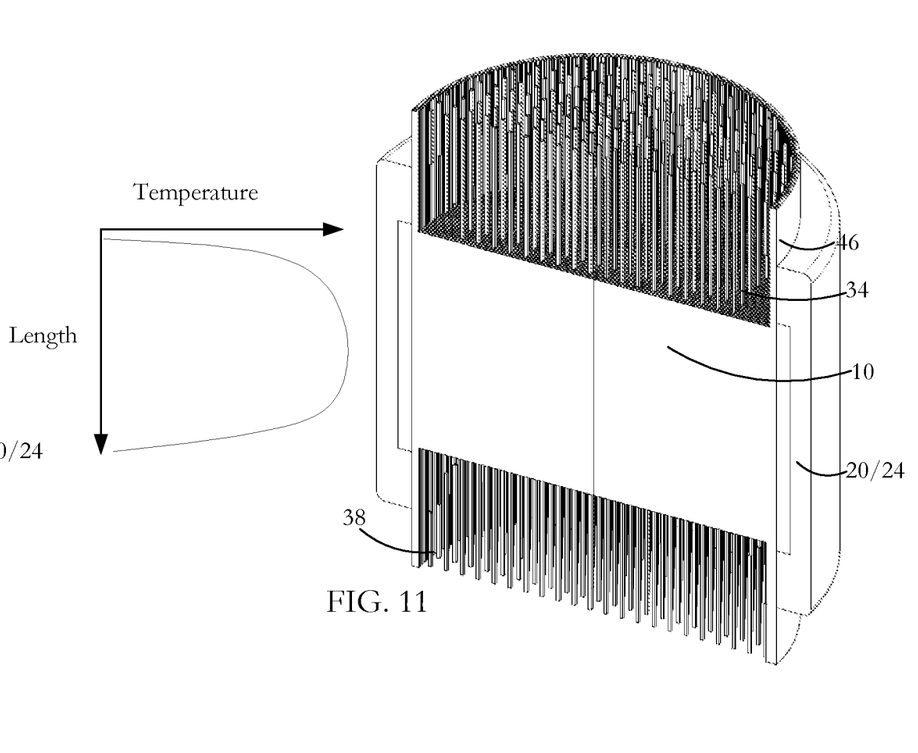
FIG. 11 is a perspective sectional view showing a gaseous emissions treatment unit according to an embodiment of the invention having heating elements projecting from both end face of a substrate body having a stepped configuration, the figure accompanied by a graphical representation showing heating profile along the unit.

In another embodiment of the invention as shown in FIG. 10, with pins 34 protruding from one face 36 of the substrate, and FIG. 11, with pins 34, 38 protruding from both faces 36, 40 of a core part of the substrate 10, an outer shell 46 of the substrate has L:D>=0.75:1 with the shell being roughly equal in length to the length of the longest heating element but with the internal honeycomb structure being <0.75:1. This design facilitates the use of a longer coil and magnetic flux concentrator that typically translate to better electromagnetic efficiencies when paired with longer heating element lengths. The shell 46 is relatively thin compared to the overall diameter of the substrate 10. The border of commercially available ceramic substrates is typically one cell diameter at its thickest. Because much of the border is solid ceramic (no cells), a shell 46 consisting of the border region provides a fairly strong structure in spite of its small thickness. The border thickness is about 0.847 mm for a 900 cpsi substrates, 1.036 mm for a 600 cpsi substrate, and 1.27 mm for a 400 cpsi substrate. If a stronger shell is desired then it may extend radially inwardly across one or more layers of cells, the actually selected shell thickness depending on the corresponding undesirable loss of usable area in terms of treatment surface of the emissions treatment unit. In one example, a 101.6 mm substrate with a 3.175 mm thickness border loses roughly 11% of its usable area. Emissions gas migrates to the path of least resistance, being the shorter length substrate just inside the shell. 10% loss is considered acceptable given the improved performance that the heating slice presents. The presence of the shell 46 also improves the insulating value to the coil and MFC. This same 3.175 mm shell thickness for a 132 mm substrate represents a loss of usable area of roughly 9%.

As shown by the graphical representation in FIG. 7, an inductively heated ceramic structure having coextensive heating elements and an aspect ratio L:D>=0.75:1, when in use and with gaseous emissions flowing from front to back, are relatively cool near the substrate front and back faces and hotter an intermediate heating region. Near the relatively cool inlet face, the incoming exhaust gas does not reach light-off temperature quickly. Light-off occurs some way along the ceramic substrate. Consequently, there is a delay before the gas flow reaches the downstream hot core of the ceramic, with the front part of the ceramic having a minor effect on the incoming exhaust gas temperature.

As shown by the graphical representation in FIG. 11, a compact heating unit having an aspect ratio L:D<0.75:1 that is operable to obtain a higher temperature for a given time/shorter heating time to a given temperature is also characterized by a relatively high surface temperature at the front face of the substrate. Reducing the length of the ceramic substrate at the front face independent of the heating element profile results in an increase in the substrate front end temperature. This increase arises firstly because of a reduced amount of ceramic to conduct heat away from the heating elements, and secondly because the substrate front face intersects hotter points along the heating elements closer to the central heating region. Together, this results in a hot, intense heating slice with high electromagnetic efficiency. In the L:D=0.38:1 example compared to the L:D=1.15:1 example from above, the estimated 3× the heating intensity of the compact design is not fully realized but a 2 to 2.5× improvement is readily achieved.

Heated rear projections 38 provide some heating of the back of the substrate 10 but the effect is minor compared with heated front projections 34 because heat is being transferred into the substrate 10 from the back face 40 in a direction opposite to the exhaust gas flow. However, heated rear projections 38 can have a significant influence on an immediately downstream treatment unit such as a second catalyst brick, a particulate filter or a selective catalyst reduction unit by preheating gas before it flows into the downstream unit.

The gaseous emissions treatment units of FIGS. 8 through 11 can be heated in a pre-start-up mode, in a post start-up mode and in a combination mode where heat energy is added before exhaust flow during preheating to overcome the thermal inertia of the ceramic and then heat is added after engine start where the heat energy is supplemented by the heat from the engine with the result being faster light-off than normal running alone. In pre-start-up, in the absence of gaseous emissions flow, some induction pre-heating of air surrounding the protruding parts of the heating elements occurs. Air is a good insulator, so heat transfer is limited but natural convection induces a small amount of airflow near the heating elements. The preheated air is available at the instant the exhaust gases start to flow and, during a cold start, adds additional heating to the inlet face of the ceramic to resist the cooling effect of the start temperature incoming exhaust.

A pin projection such as feature 34, 38 or 44 must have an anchored length within a cell that supports the pin sufficiently that it neither falls out of, nor damages the walls of, the cell within which it is fixed. While dependent on the specific nature and dimensions of the substrate cells/walls and of the wire, a 1:1 ratio of protruding pin length to retained pin length provides effective support for materials and dimensions that are currently state of the catalytic converter art as modified for induction heating. The ratio may differ for other pin and substrate materials, configurations and dimensions. Smaller diameter pins are limited to a protruding pin length to retained pin length ratio <1:1 because such a smaller diameter pin provides less support for the pin length extending beyond the ceramic. There is also a limit to the pin protruding length based on design limitations of the catalyst unit itself. Currently, 30 mm represents a practical upper limit of the pin protrusion length from the face of the substrate, with the substrate length typically being equal to or longer than the length of the associated magnetic flux concentrator and coil. With new materials and structures, this limit may be lowered in future. A 60 mm heating element satisfies both criteria with a 1:1 ratio of protruding pin length to retained pin length and a 30 mm protrusion from the ceramic. At a 900° C. maximum gas exhaust temperature and a mass flow rate of 600 kg/hr., heating element deformation does not occur in a 30 mm projecting pin length within a conventional 400 or 900 cpsi ceramic substrate. 30 mm is currently considered to be at or near a practical upper length limit based on high cell per square inch ceramic substrates (connoting small heating element diameters) and a 6 inch or less ceramic substrate diameter but this may change in future as new materials, structures and dimensions are found to be practical. Note that the volumetric flow rate (volume/time) is obtained by dividing the mass flow rate by the density of air at that temperature. The mass flow rate being 600 kg/h or 0.1667 kg/s and the density of air at 900° C. being 0.3009 kg/m^3, a volumetric flow rate of 0.55 m^3/s obtains.

The retained heating element section is bonded or retained in a cell by methods such as those described in U.S. Pat. No. 9,488,085, which patent is assigned to the current assignee and is incorporated herein by reference in its entirety for all purposes. In one form of heating element fixing, an interior anchoring part of the element is bonded to the walls of the cells in which it is fixed using a ceramic mastic or glue that retains the heating element within the cell of the ceramic substrate. In another form, the wire or pin is formed with a bow or other non-linear element, at least a part of the non-linear element bearing against the interior surface of the cell walls to frictionally retain the wire in the cell. In a further form, bonding and frictional retention are both used to fix the wire stem in place.

Pin ends at the front or back of an inductively heated gaseous emissions treated unit do not have to be coterminous: i.e. in the same cross plane. The "group" profile of the pin tips may be flat, convex, concave or some other form depending on the desired effect.

Electromagnetic efficiency must be considered in conjunction with application requirements. For example, one target might be the same heating energy in each pin. Another might demand more heating in the centre of the unit where the flow is higher at low overall flow rates. Yet another might demand more heating on the outside of the unit where the volume of heating elements and ceramic are higher and more efficient. Where the pins protrude, a ceramic envelope does not constrain performance and so there are more options in the shaping of the heating profile.

Figures 12, 14:
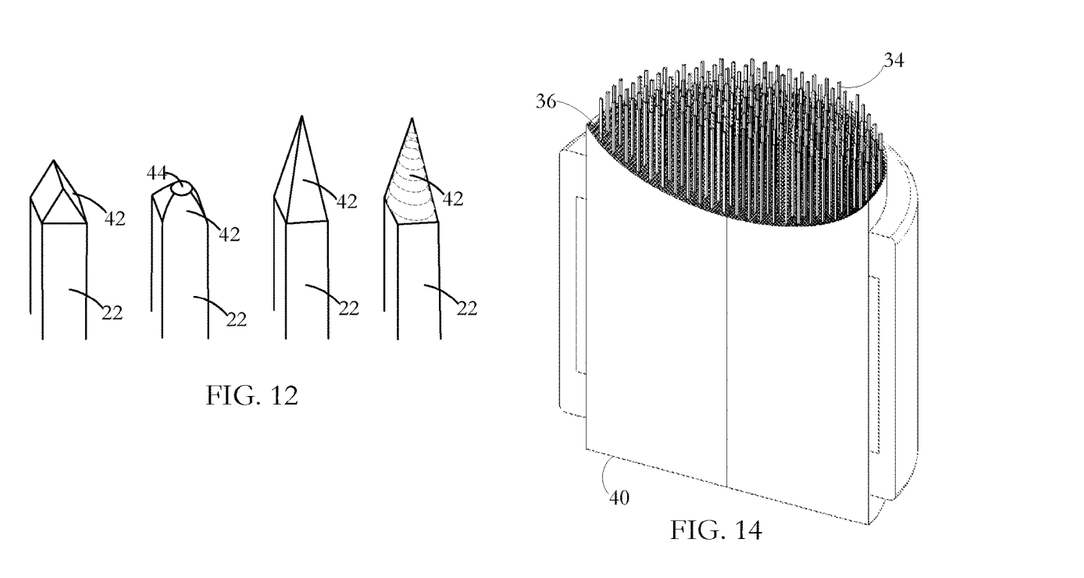
FIG. 12 shows a range of end formations for end parts of induction heating pins according to an embodiment of the invention.
FIG. 14 is a perspective sectional view showing a gaseous emissions treatment unit according to an embodiment of the invention, the unit having a substrate body having a concave end face.

The tip of each heating element may be flat or may have a profile such as any of those described and illustrated in U.S. patent application Ser. No. 15/486,369 entitled "Methods for inserting wires in an induction heated gaseous emissions treatment unit" which is hereby incorporated by reference in its entirety for all purposes. When facing into an emissions gas flow, a flat pin end profile has a high impingement loss resulting in an undesirable pressure drop in the exhaust system. A bullet or pointed tip provides less impingement loss because the transition is more aerodynamic. Examples of beneficial pin end profiles 42 are shown in FIG. 12. In the case of rear projections 38, a planar tip has less effect than in the case of planar tipped front projections 34. However, a turbulent wake that forms after a square end pin tip is reduced with a tip formation such as any of those shown in FIG. 12 and is virtually eliminated if the pin tip is formed with a tear drop tail.

Inevitably, as an artefact of manufacturing, protruding pin lengths of a gaseous emissions treatment unit are not strictly parallel because, unlike anchoring parts of the pins within the cells, the protruding parts are not constrained to follow parallel cell walls. However, in operation as a catalytic converter or particulate filter, input and output exhaust flows are relatively dynamic and is not affected in any significant way by lack of parallelism of the heating elements protrusions. The flow readily adapts to most variations in geometry to produce a relatively uniform/consistent flow profile. In another embodiment of the invention, two pins are formed with the outer ends of the pin projecting portions integral with one another. For example, a longer wire length is bent over before the free ends are inserted into respective ones of a pair of cells. One advantage of such a structure is that the projecting parts are mutually supporting lessening the chance that the projecting parts depart from parallelism. This structure serves to break up the emissions gas wave front that can also be an advantage but is at the cost of increased back pressure. Other forms of wire loop can be adopted as disclosed in co-pending U.S. application Ser. No. 15/279,857 which is incorporated herein in its entirety by specific reference and for all purposes.

The coil and magnetic flux concentrator have a much lower survivability temperature than the ceramic of the substrate or the layer of insulating mat which is normally positioned between the coil and the concentrator. The coil and magnetic flux concentrator are protected from the 900+C temperature exhaust gases by the ceramic and the insulating mat, the latter providing both heat and vibration protection because the emissions gas must pass through the ceramic and the insulating mat before reaching the coil and/or concentrator where the temperature is typically below 500 C. If the ceramic is linearly coextensive with the magnetic flux concentrator, the front face of the magnetic flux concentrator and the adjacent part of the coil may be exposed to the hot exhaust gases. Designs in which the ceramic is longer than the magnetic flux concentrator and coil combination ensure protection from the hot emissions gas for both the inside diameter and front/rear faces of the magnetic flux concentrator and adjacent coil parts.

Each of the structures described and illustrated can be configured simply as a pre-heater for a downstream gaseous emissions treatment unit, the pre-heater having little or no gaseous emissions treatment function. Alternatively, each of the structures can be configured as a gaseous emissions treatment unit. In a treatment unit for use as a catalytic converter, a layer of catalyst-containing material lines the cell walls with, optionally, a catalyst layer also being formed on the outside surfaces of the wires that are located in selected ones of the cells. Catalyst may also, if desired, cover the projecting wire portions. Although the surface area of protruding pins is lower than the catalyst coated cell walls of the ceramic, catalyst coated front projecting pins 34 act to initiate a catalytic gas treating reaction earlier both in position and time compared to reactions taking place within the ceramic substrate. This results in improved catalytic performance. Rear projecting pins 38 have a minor effect and act merely to supplement the catalytic reaction taking place in the substrate before the treated gas finally leaves the treatment zone of the unit.

In a unit configured as a particulate filter, certain of the cells not occupied by induction heating wires are blocked at the input end and other of the cells are blocked at the output end. Gaseous emissions entering the cells that are open at their front end pass through the porous cell walls before exiting from the cells that are open at their back end, with the cell walls act to filter out particulate matter from the gaseous emissions. There may or may not be catalyst action in a particulate filter. In the latter case, induction heating is used periodically to assist in burning off filtered residue that would otherwise eventually clog pores in the cell walls.

Figures 13, 15:
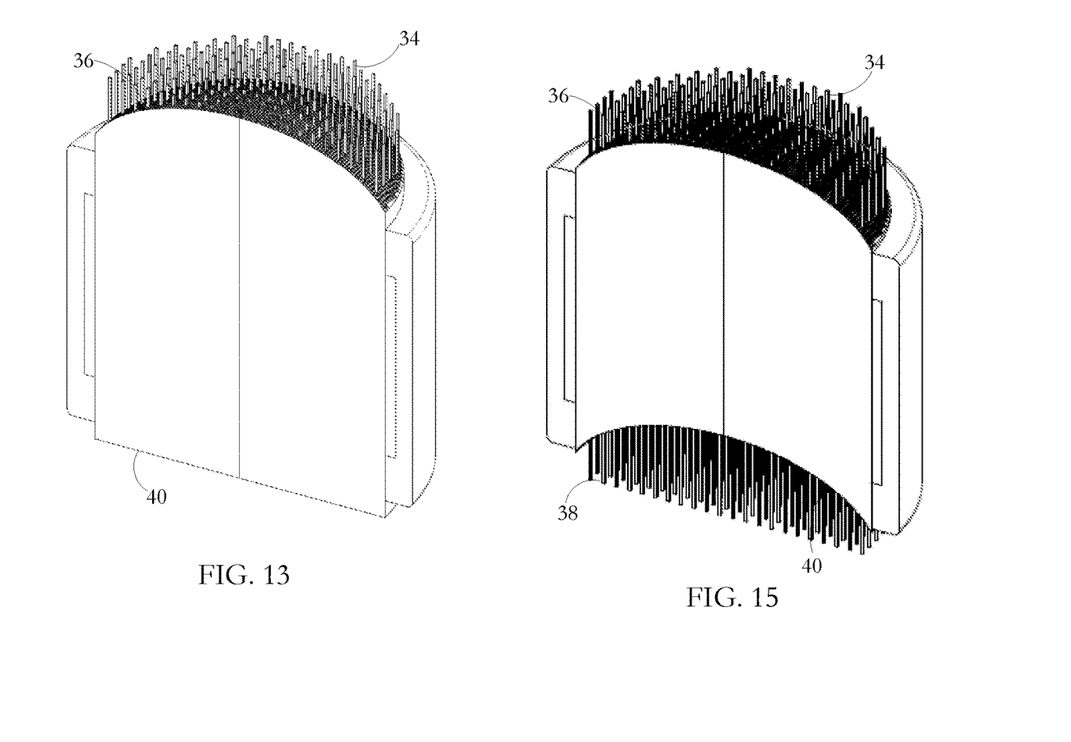
FIG. 13 is a perspective sectional view showing a gaseous emissions treatment unit according to an embodiment of the invention, the unit having a substrate body having a convex end face.
FIG. 15 is a perspective sectional view showing a gaseous emissions treatment unit according to an embodiment of the invention, the unit having a substrate body having a convex front face and a matching concave end face.

In another embodiment of the invention, as shown in FIGS. 15 to 17, the ceramic substrate itself can have an end profile at the back or front that is other than flat; for example, it can be concave, convex, conical or some other form depending on the desired influence of the ceramic substrate on the heating profile of the wires/pins. Whether the substrate has projecting pin portions or not, a concave end face channels emissions gas flow to some extent towards an axial core region of the substrate. Similarly, a convex end face channels emissions gas flow to some extent towards the perimeter of the substrate, the channelling being less for a relatively large radius of curvature than for a relatively small radius of curvature. The end face, whether front, back or both can have a non-uniform form such as annular ridges. One face can be convex with the opposite face being matched concave meaning that the cells of the substrate are of the same length but with a cell longitudinal position depending, in the case of a cylindrical substrate, on its annular position. If one or both end faces has projecting pin portions, then the length of the projecting pin portions and curvature of the substrate end face(s) face can be selected to obtain any of a variety of different induction heating and flow effects.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. An assembly for treating gaseous emissions comprising a substrate body having a plurality of cells for the passage of emissions gas, respective lengths of conducting wire located in each of a first set of the plurality of cells, and an induction heating coil for generating a varying electromagnetic field, thereby to inductively heat the lengths of conducting wire, the substrate body having a front for entry of flowing gaseous emissions and a back for exit of treated gaseous emissions, at least some of the lengths of conducting wire having a part projecting from at least one of the front and back of the substrate body.

2. The assembly as claimed in claim 1, the coil having a part thereof projecting beyond said one substrate body end, wherein the end of the coil generally matches the position of a leading tip of at least one of the wire projecting parts.

3. The assembly as claimed in claim 1, the cells being through cells extending from the front to the back of the substrate, the conducting wires blocking the cells of said first set.

4. The assembly as claimed in claim 1, the assembly forming part of a particulate filter, the cells of the first set blocked at the front of the substrate, cells of a second set of the plurality of cells different from the first set being blocked at the back of the substrate, at least one of the blocked cells being blocked by a respective length of the conducting wire.

5. The assembly as claimed in claim 1, wherein at least some of the projecting parts have a tip end profile that is other than flat.

6. The assembly as claimed in claim 1, wherein at least one of the conducting wires has said projecting part integral with a retained part located within a respective cell, the length of said projecting part being generally equal to the length of the retained part.

7. The assembly as claimed in claim 1, wherein at least one projecting part projects from a front face of the substrate body and has a wave front-breaking shape so as to break up a pressure wave front of approaching emissions gas flowing into the cells of the second set.

8. The assembly as claimed in claim 7, wherein the length and form of the projecting part is not so long that with an emissions gas flow rate up to up to about 0.55 m$^3$/sec., the broken pressure wave front will re-establish before the approaching emissions gas meets the front face.

9. The assembly as claimed in claim 8, wherein the wave front-breaking shape of the projecting part has a curved or pointed profile.

10. The assembly as claimed in claim 8, wherein the wave front-breaking shape of the projecting part is a loop.

11. The assembly as claimed in claim 1, the conducting wires forming an array having an overall longitudinal extent, the coil having a length substantially matching said overall longitudinal extent.

12. The assembly a claimed in claim 1, the substrate body having an axial region shorter than a perimeter region.

13. The assembly a claimed in claim 12, wherein there is a step transition between the axial region and the perimeter region.

14. The assembly as claimed in claim 1, the substrate having an end face that is non-planar.

15. The assembly as claim 14, the substrate having an end face that is one of concave, convex and generally conical.

16. The assembly as claimed in claim 1, wherein for a cylindrical substrate body, the cylindrical substrate body has a length to diameter ratio less than 0.75:1.

17. A method for treating emissions gas comprising:
  providing an apparatus having a substrate body having a plurality of cells, respective lengths of conducting wire located in each of a first set of the plurality of cells, and an induction heating coil for generating a varying electromagnetic field, thereby to inductively heat the lengths of conducting wire, the substrate body having a front for entry of flowing gaseous emissions and for passage of the gaseous emissions gas along cells of a second set of the plurality of cells, and a back for exit of treated gaseous emissions, at least some of the lengths of conducting wire having a part projecting from at least one of the front and back of the substrate body;
  energizing the induction coil to generate the varying electromagnetic field thereby to inductively heat the respective lengths of the at least some of the lengths of conducting wire located in each of the first set of cells of the plurality of cells, and also to inductively heat the projecting part of the at least some of the lengths of conducting wire, and
  flowing emissions gas into the front end of the substrate body, along cells of the second set thereof, and out of the back end of the substrate body as treated emissions gas.

* * * * *